United States Patent
Jones

(10) Patent No.: US 6,644,747 B2
(45) Date of Patent: Nov. 11, 2003

(54) DETACHABLE HEAD SUPPORT FOR A CHILD SAFETY SEAT

(76) Inventor: Eugene H. Jones, 2014 Kent St., Wilmington, NC (US) 28403

( * ) Notice: Subject to any disclaimer, the term of this patent is extended or adjusted under 35 U.S.C. 154(b) by 0 days.

(21) Appl. No.: 10/260,106

(22) Filed: Sep. 27, 2002

(65) Prior Publication Data

US 2003/0137176 A1 Jul. 24, 2003

Related U.S. Application Data

(60) Provisional application No. 60/351,830, filed on Jan. 24, 2002.

(51) Int. Cl.$^7$ ................................................ A47C 7/38
(52) U.S. Cl. ................. 297/399; 297/397; 297/400; 297/401; 297/404; 297/410
(58) Field of Search .................. 297/397, 399, 297/400, 401, 404, 410, 219.12, 487, 488

(56) References Cited

U.S. PATENT DOCUMENTS

| | | | |
|---|---|---|---|
| 3,578,383 A | 5/1971 | Earl ..................... | 297/397 X |
| 3,608,964 A | 9/1971 | Earl .......................... | 297/397 |
| 4,031,578 A | 6/1977 | Sweeney et al. | |
| 4,565,405 A | 1/1986 | Mayer .................... | 297/397 X |
| 5,108,152 A | 4/1992 | Reilly et al. ............ | 297/397 X |
| 5,161,522 A * | 11/1992 | Clevenger ............... | 297/410 X |
| 5,372,405 A * | 12/1994 | Cash et al. ......... | 297/219.12 X |
| 5,383,711 A | 1/1995 | Houghteling ............... | 297/397 |
| 5,735,576 A | 4/1998 | Pepys et al. ................ | 297/397 |
| 5,800,019 A * | 9/1998 | Knightlinger ........... | 297/397 X |
| 5,829,829 A | 11/1998 | Celestina-Krevh ..... | 297/219.12 |
| 6,123,389 A | 9/2000 | O'Connor et al. .......... | 297/397 |
| 6,139,100 A * | 10/2000 | Baskin-lockman et al. . | 297/397 X |
| 6,485,101 B2 * | 11/2002 | Kassai et al. ........... | 297/410 X |

* cited by examiner

Primary Examiner—Rodney B. White
(74) Attorney, Agent, or Firm—MacCord Mason PLLC

(57) ABSTRACT

First and second head supports are releasably attached to the side edges of a child safety seat. Each of the head supports has a cushion section positioned on the inner side of the seat back and a clamp arm positioned on the outer side of the seat back, with the clamp arm having a proximal end attached to the cushion section. The spacing between the clamp arm adjacent the proximal end of the cushion section is approximately equal to the width of the seat back. Preferably, the cushion section is generally cubical, with first and second headrest faces, permitting use of the head supports on seats having backs with side edges generally parallel to the seat back center section, as well as seat backs having side edges generally perpendicular to the seat back center section.

12 Claims, 4 Drawing Sheets

PRIOR ART

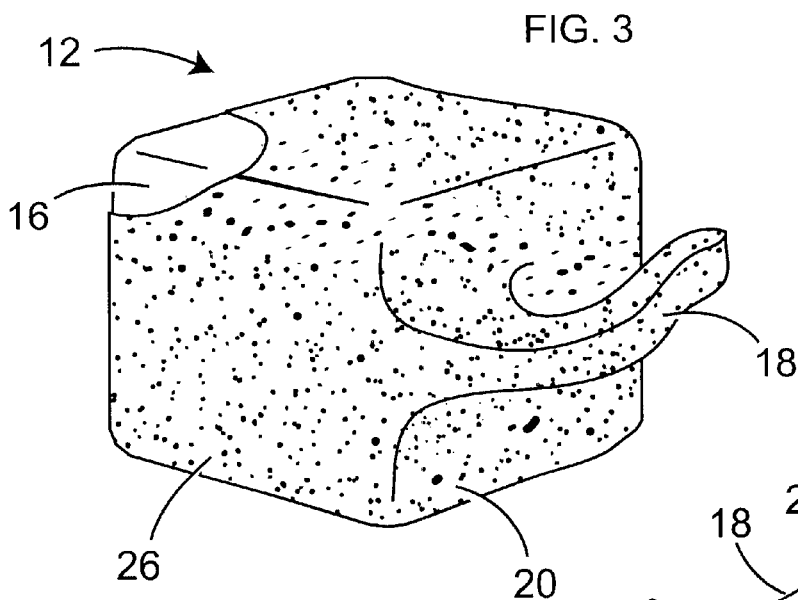
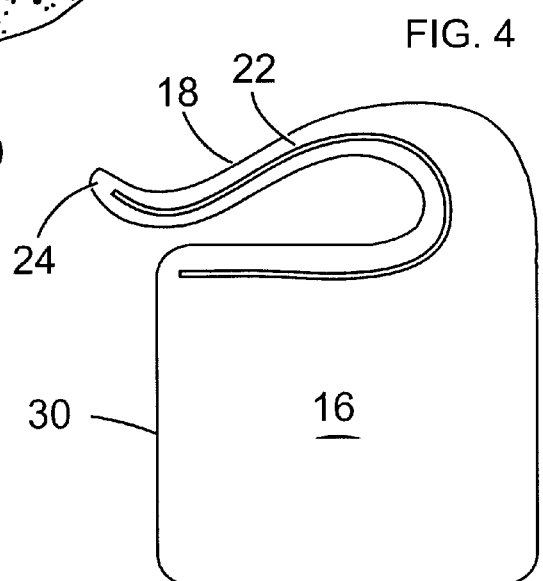
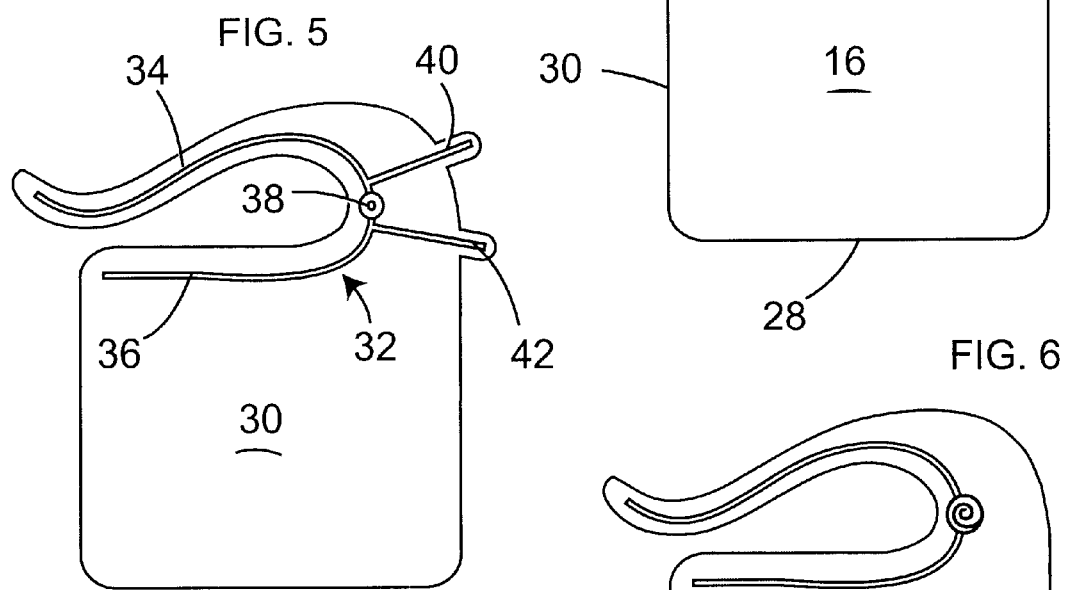

DETACHABLE HEAD SUPPORT FOR A CHILD SAFETY SEAT

This application claims the benefit of U.S. Provisional Application No. 60/351,830 filed Jan. 24, 2002, and entitled "Headrest Cushion Clamps for a Child Safety Seat".

FIELD OF THE INVENTION

The present invention generally relates to safety attachments for a child safety seat. Specifically, the present invention is a new type of detachable head support for a child safety seat useful in preventing discomfort and injury to a sleeping child.

BACKGROUND OF THE INVENTION

Children in the United States are required by law to be restrained within a child safety seat while riding in a motor vehicle. Child safety seats are designed to prevent injury to children by providing a separate seat having secondary restraints that are superior to standard adult safety belts.

A standard child safety seat is made of a unitary plastic shell having a back and sidewalls that partially enclose a volume large enough to accommodate the hips and upper body of a child. The shell is lined with a soft cushion, and more importantly includes a securely attached child restraint harness. In operation, a child is seated within the protective shell of the safety seat and the restraint harness is secured around the shoulders and upper body of the child.

The protection afforded by modern safety seats is outstanding as long as the child is awake and alert. However, if the child falls asleep and relaxes his or her neck muscles, minor injury can result as a result of neck strain. More serious injury to the head and neck can occur as a result of applied g-forces in the event of a vehicle crash, or even non-crash injuries can occur as a sleeping child's head slams from side-to-side during vehicle turns and lane changes.

This problem is well recognized in the prior art, and various devices have been proposed to alleviate the risk of injury. Basically, these devices are comprised of cushions that are positioned on either side of the child's head, so that the child will rest his or her head on one of the cushions when sleeping. The cushions may be detachably secured to the sides of the seat, attached to the shoulder areas of the seat belt, or even wrapped around the child's neck. Despite the large number of devices proposed, no device has been widely accepted to address this need.

It is believed that the reasons for this lack of acceptance are two-fold. First, prior art devices tend to be difficult to attach and remove, detracting from their use. Second, in many instances, the devices are useful with only one type of seat, requiring the purchase of a new type of device, if available, if the seat is replaced, or when the child begins use of a booster seat instead of a safety seat.

What is needed is a readily attachable and detachable head support that will effectively support the position of a child's head in seats of different configurations.

SUMMARY OF THE INVENTION

The present invention addresses this need by providing a convenient and easy to attach head support that restrains the lateral movement of a sleeping child's head. The head support, two identical supports being used on the left and right sides of a seat, is comprised of a cushion that is adapted to quickly and easily clamp securely to the sides of seats of various configurations at locations level with the child's head.

The cushion section of each support is dimensioned to extend inwardly from the side of the seat and includes at least one headrest face that is generally perpendicular, e.g., within 30° of perpendicular, to the back of the seat, is positioned so that the child's head will rest against the headrest face with the child's head and neck in a substantially upright position.

Each head support also includes a clamp attached to one side of the cushion section. The clamp includes a clamp arm attached to a clamp face of the cushion section. The clamp arm includes a proximal end and a free distal end, and is moveable between an open position and a closed position. The proximal end of the clamp arm is attached to the cushion section, with the arm adjacent the proximal end being spaced from the cushion member at a distance approximately equal to the thickness of the seat arm over which the head support is to be attached, while the distal end of the clamp arm is adjacent the cushion member when the clamp arm is in the closed position. The tip of the clamp arm may curve outwardly, i.e., away from the cushion member, to facilitate positioning of the head support over the edge of the seat arm.

The preferred clamp arm includes a resilient clamping member that is preferably covered by a foam or other cover to minimize the risk of injury to the child. The resilient member includes an outer section that conforms to the shape of the clamp arm and extends through the clamp arm from the proximal end to substantially the distal end, and an inner member that is attached to the cushion section. The inner and outer sections of the resilient member may be of a unitary construction urging the clamp arm toward the closed position. For example, the resilient member may be a curved metal or plastic strip.

Alternatively, the inner and outer sections of the resilient member may be hinged together, with a spring urging the distal ends of the sections toward each other. In this alternative, handles, which may also be covered with a foam material, can be attached to the sections to facilitate opening of the clamp arm.

As noted previously, the head supports are preferably useful on seats having different configurations. For example, some seats may be comprised of a back section with a center section and side arms that extend generally perpendicular forward from the outer edges of the center section, so that the head supports will be clamped to the side arms. Other seats may be comprised of a back section without side arms, or with side sections substantially parallel to the center section. The orientation of the head supports when used on the different seats will be different, rendering most prior art devices unsuitable for use with both seat types.

The present invention addresses this prior art deficiency by providing a head support with two headrest faces that are oriented at a 90° angle to each other. One of the headrest faces is parallel to, and on the opposite side of the cushion section from, the clamp face of the head support, while the second headrest face is located on the inner side of the cushion section, extending between the edge of the first headrest face and the distal edge of the clamp face.

Preferably the cushion section of the head support is substantially cubical, with parallel top and bottom surfaces, a clamp face parallel to and extending between the top and bottom surfaces, a first headrest face opposite the clamp face side, a second headrest face extending between the clamp face side and the first headrest side at about a 90° angle to the first headrest side, and a back side opposite the second headrest side.

The cushion section and the covering over the clamp arm are formed of a resilient foam, such as foam rubber of a foamed synthetic plastic, such as polyurethane. The foam can be skinned or covered with a cloth or plastic covering material, such as terry cloth.

BRIEF DESCRIPTION OF THE DRAWINGS

FIG. 3 is a perspective view of a head support of the present invention.

FIG. 4 is a sectional top view of one embodiment of the head support.

FIG. 5 is a sectional top view of a second embodiment of the head support.

FIG. 6 is a sectional top view of a third embodiment of the head support.

DETAILED DESCRIPTION OF THE PREFERRED EMBODIMENT

Figure 1:
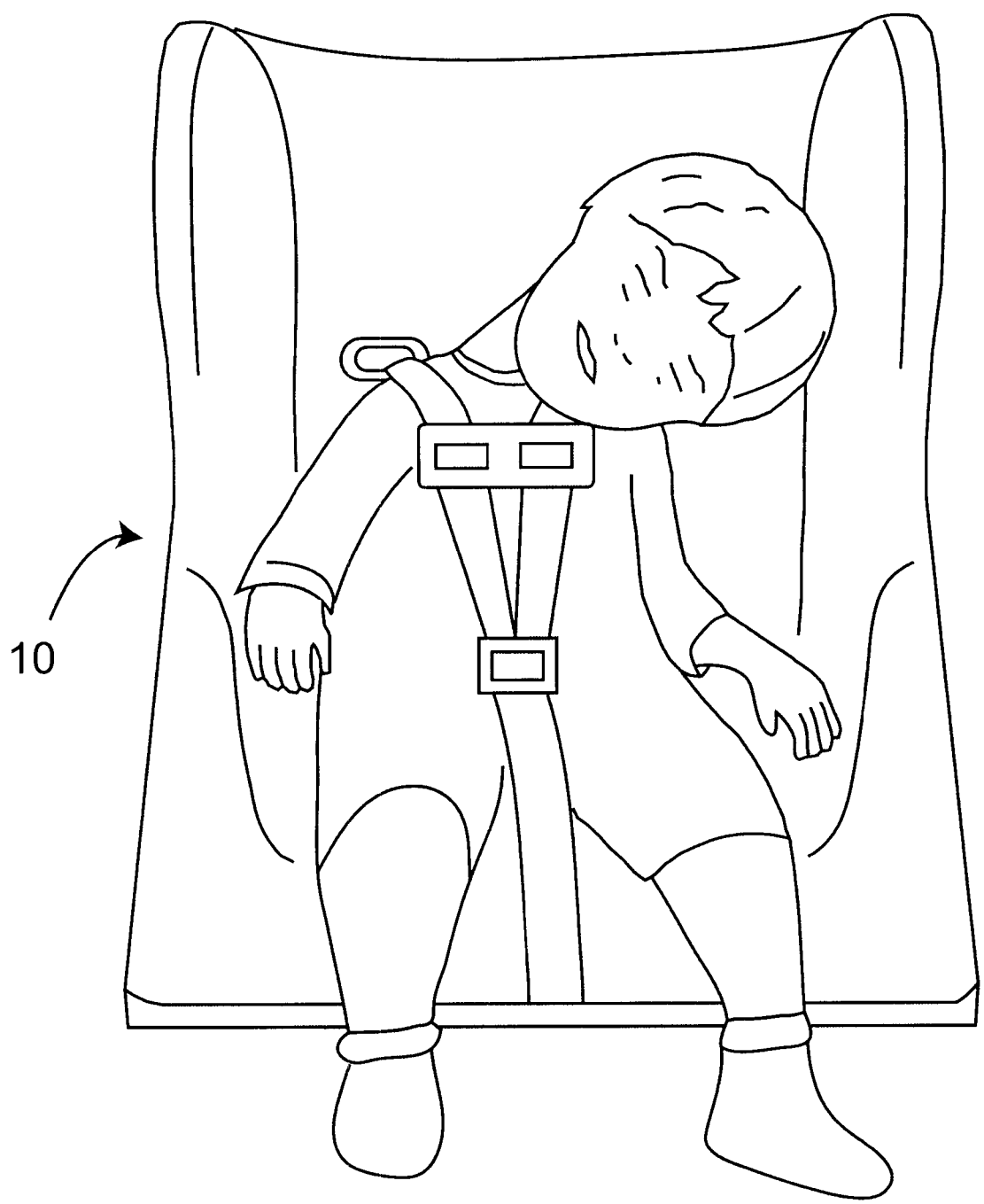
FIG. 1 is a frontal view of a child in a standard safety seat without the present invention.

FIG. 1 is an illustration of the prior art, showing a sleeping child restrained in a standard child safety seat, generally 10, having no head or neck support. As a result, the sleeping child has unconsciously allowed his head and neck to assume an uncomfortable position leaning far to one side, which is not only uncomfortable, but which can cause neck trauma in the event the child were to experience high lateral acceleration, "slamming" his head to one side. Beyond this danger, there is a risk of soft tissue damage as a result of the child having his head in such an awkward position for a prolonged period of time. The problems that can occur from the head position shown in FIG. 1 range from minor neck cramping to severe and dangerous blood flow restriction.

Figure 2:
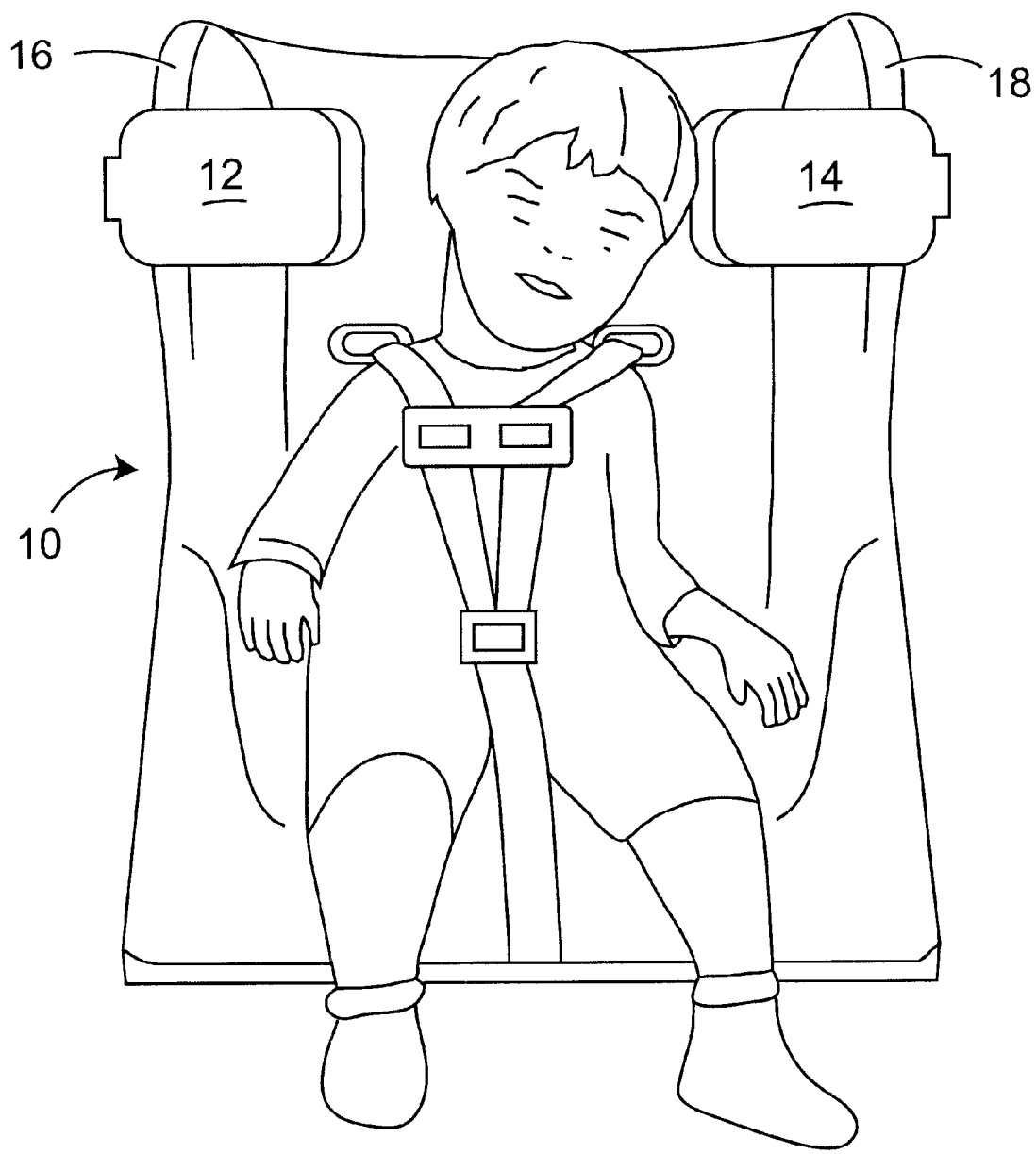
FIG. 2 is a frontal view of a child in a safety seat with the head support of the present invention properly installed.

FIG. 2 shows the same child asleep, however this time cushion head supports, generally 12 and 14, of the present invention are detachably clamped to sidewalls 16 and 18, respectively, of safety seat 10. Supports 12 and 14 hold the child's head in an upright position insuring proper blood flow as well as greater comfort.

As best shown in FIGS. 3 and 4, head support 12 is comprised of a generally cubical foam cushion member 16 having a clamp arm 18 attached adjacent clamp face 20. Clamp arm 18 includes a resilient spring member 22, also covered by foam, urging clamp arm 18 to a closed position adjacent clamp face 20. Clamp arm 18 is spaced from cushion section 16 adjacent the proximal end by a distance approximately equal to the thickness of the seat back or side upon which the head support is to be attached, and curves inwardly toward its distal end. Tip 24 of arm 18 may curve outwardly to facilitate insertion of a seat back or side between cushion member 16 and arm 18. Cushion member 16 and arm 18 are covered with a terry cloth cover 26. Cushion member 16 includes a first headrest face 28 opposite clamp face 20, and a second headrest face 30, both faces being generally rectangular and planar, extending between the clamp fact 20 and face 28.

FIG. 5 illustrates an alternative embodiment of the head support comprised of a cushion member 32 with imbedded clamp arm, generally 34, formed of an outer arm section 36 and an inner arm section 38 joined at their proximal ends by a springloaded hinge 40 to urge the distal end of section 36 toward cushion member 32. Covered handles 42 and 44 extend outwardly from sections 36 and 38, respectively, to facilitate opening of arm 36 to insert the head support over the seat edge. FIG. 6 illustrates a similar embodiment without handles 42 and 44.

Figure 7:
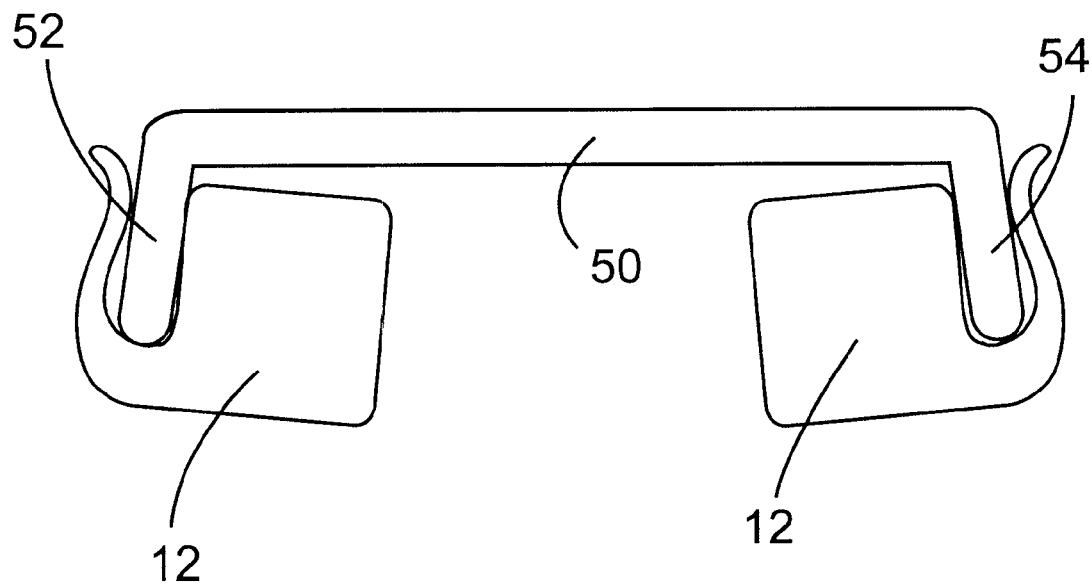
FIG. 7 is a top view of one type of car seat back with two head supports attached.
Figure 8:
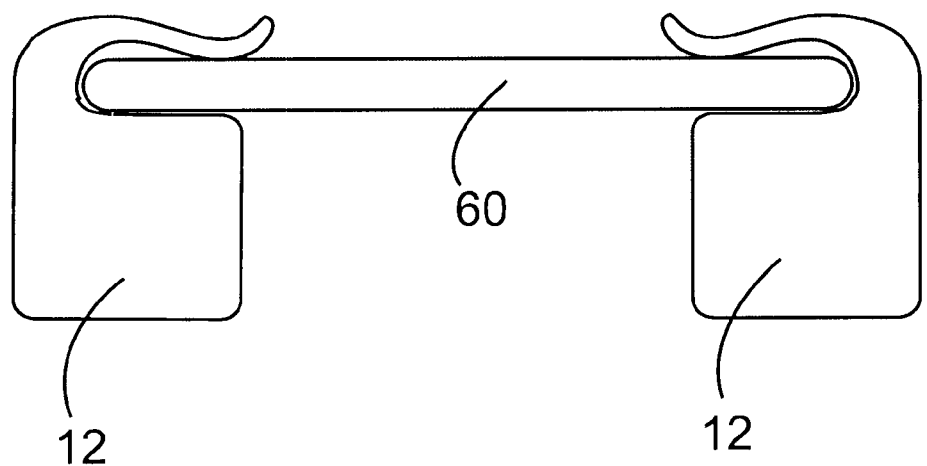
FIG. 8 is a top view of another type of car seat back with two head supports attached.

FIG. 7 is a top view of one type of seat back 50 that includes forwardly directed ends 52 and 54. Head supports 12 are attached to ends 52 and 54 so that first headrest face 28 is directed toward the interior of the seat, providing a support for the child's head. FIG. 8 is a top view of another type of seat back 60 without forward directed ends. With this type of seat, head supports 12 are fitted over the end of the seat back, so that second headrest face 30 is toward the interior of the seat, providing a support for the child's head. Thus, with the present invention, the head support is useable with seats of different configurations.

As will be apparent from the drawings, and especially FIGS. 7 and 8, the head supports are simply pushed onto the upper edges of the seat back at a level with the child's head. The resilient clamp arm holds the head support securely in place. The space between the clamp face of the cushion section and the proximal end of clamp arm 18 permits easy insertion of the seat back. Due to the unique configuration of the head support, a headrest face is toward the child's head with seats having backs of different configurations. The head support can be easily removed by pulling it away from the seat back.

Thus, the present invention results in a seating assembly for seating a child in a vehicle comprising a seat having a back with a given width, a center section, and first and second side edges, the edges having an inner side and an outer side; and first and second head supports releasably attached to the seat side edges, each of the head supports having a cushion section positioned on the inner side of the back and a clamp arm positioned on the outer side of the back, the clamp arm having a proximal end attached to the cushion section, the spacing between the clamp arm adjacent the proximal end and the cushion section being approximately equal to the width of the seat back. The first and second side edges may be substantially parallel to the center section, or the first and second side edges may be substantially perpendicular to, i.e., within 30° of perpendicular of, the center section.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A head support adapted for attachment to the back of a child's safety seat, said back having a given thickness comprising:

a) a foam cushion section having a clamp face and a headrest face; and b) a clamp arm having a proximal end attached to said clamp face, said arm being spaced from said clamp face at adjacent said proximal end at a distance approximately equal to said given thickness, and a distal end, said arm curving inwardly toward said distal end, said clamp arm including an outer arm section having a distal end and a proximal end, and an inner arm section having a distal end and a proximal end, said arm sections being hinged to each other at their proximal ends by a springloaded hinge urging the distal end of said outer arm section toward said clamp face.

2. The head support of claim 1, further including a cloth covering over said cushion section and said clamp arm.

3. The head support of claim 1, wherein said clamp arm has an outwardly curved tip at its distal end.

4. The head support of claim 1, wherein said cushion member is generally cubical.

5. The head support of claim 1, wherein said headrest face is opposite said clamp face.

6. A head support adapted for attachment to the edge of the back of a child's safety seat, said edge having a given thickness comprising:
   a) a generally cubical foam cushion section having a top surface, a bottom surface, a clamp face extending between said top and bottom surfaces, a first headrest face on the opposite side of said cushion section from said clamp face, and a second headrest face extending between said clamp face and said first headrest face; and
   b) a clamp arm adjacent said clamp face, said arm having a proximal end joined to said clamp face, said arm adjacent said proximal end being spaced from said clamp face at a distance approximately equal to said given thickness, a distal end, a resilient member urging said clamp arm distal end toward said clamp face, and a foam covering over said resilient member.

7. The head support of claim 6, wherein said clamp arm curves inwardly toward said distal end.

8. The head support of claim 6, wherein said clamp arm distal end includes an outwardly curved tip.

9. A seating assembly for seating a child in a vehicle comprising:
   a) a seat having a back with a given width, a center section, and first and second side edges, said edges having an inner side and an outer side; and
   b) first and second head supports releasably attached to said seat side edges, each of said head supports having a cushion section with a clamp face and a headrest face opposite said clamp face positioned on the inner side of said back and a clamp arm positioned on the outer side of said back, said clamp arm including an outer arm section having a distal end and a proximal end, and an inner arm section having a distal end and a proximal end, said arm sections being joined at their proximal ends by a resilient member urging the distal end of said outer arm toward said clamp face and a foam covering over said resilient member, the spacing between said clamp arm adjacent said proximal end and said cushion section being approximately equal to the width of said seat back.

10. The seating assembly of claim 9, wherein said first and second side edges are substantially parallel to said center section.

11. The seating assembly of claim 9, wherein said first and second side edges are within 30° of perpendicular of said center section.

12. The head support of claim 9, wherein said cushion member is generally cubical.

* * * * *